US008949864B2

(12) United States Patent
Geiger et al.

(10) Patent No.: US 8,949,864 B2
(45) Date of Patent: Feb. 3, 2015

(54) METHOD AND SYSTEM FOR PROVIDING A REPORT CONNECTOR

(75) Inventors: Matthias Geiger, Mannheim (DE); Miro Vins, Schwetzingen (DE); Patrick Zimmer, Walldorf (DE)

(73) Assignee: SAP SE, Walldorf (DE)

( * ) Notice: Subject to any disclaimer, the term of this patent is extended or adjusted under 35 U.S.C. 154(b) by 1684 days.

(21) Appl. No.: 11/756,341

(22) Filed: May 31, 2007

(65) Prior Publication Data
US 2008/0104616 A1 May 1, 2008

Related U.S. Application Data (60) Provisional application No. 60/855,686, filed on Oct. 30, 2006.

(51) Int. Cl.
G06F 9/46 (2006.01)
G06F 13/00 (2006.01)
G06F 9/54 (2006.01)

(52) U.S. Cl.
CPC .................................... *G06F 9/541* (2013.01)
USPC ........................................................ 719/328

(58) Field of Classification Search
CPC .................................. G06F 9/541; G06F 9/54
See application file for complete search history.

(56) References Cited

U.S. PATENT DOCUMENTS

| 5,710,900 | A | 1/1998 | Anand et al. |
|---|---|---|---|
| 6,377,993 | B1 * | 4/2002 | Brandt et al. ................. 709/227 |
| 6,385,644 | B1 | 5/2002 | Devine et al. |
| 6,658,432 | B1 | 12/2003 | Alavi et al. |
| 6,714,979 | B1 | 3/2004 | Brandt et al. |
| 6,772,137 | B1 | 8/2004 | Hurwood et al. |
| 6,947,947 | B2 * | 9/2005 | Block et al. ................. 1/1 |
| 6,993,533 | B1 | 1/2006 | Barnes |
| 7,127,444 | B2 | 10/2006 | Peake, Jr. et al. |

OTHER PUBLICATIONS

Microsoft® Computer Dictionary, Fifth Edition; May 1, 2002; Microsoft Press; 3 pages.*
Monarch V6 Standard Edition and Professional Edition; http://web.archive.org/web/20021205061107/http://hallogram.com/monarch/; archived Dec. 17, 2002; retrieved Sep. 26, 2011; 3 pages.*
Report Mining: An easier way to access corporate information; Datawatch; Nov. 2002; 20 pages.*

(Continued)

*Primary Examiner* — Hyung Sough
*Assistant Examiner* — Kimberly Jordan
(74) *Attorney, Agent, or Firm* — Kenyon & Kenyon LLP (57) ABSTRACT

A method includes transforming, by a report connector according to at least one input mapping rule of the report connector, first input data received by a first application to create second input data for a specific report of a plurality of existing reports of a second application. The method also includes providing, by the report connector, the second input data to a report application programming interface (API) capable of providing an interface to the report of the second application. The method also includes receiving, by the report connector, first output data from the report API, the first output data based on the output data from the specific report of the second application. The method also includes transforming, by the report connector according to at least one output mapping rule of the report connector, the first output data to create second output data for the first application.

19 Claims, 8 Drawing Sheets

(56) References Cited

OTHER PUBLICATIONS

Datawatch Monarch v7 Product Brochure; http://web.archive.org/web/20060509013357/http://www.datawatch.com/download/files/Monarchv7_broch.pdf; archived May 9, 2006; retrieved Oct. 12, 2011; 6 pages.*

Philippe Thiran, Geert-Jan Houben, Jean-Luc Hainaut, and Djamal Benslimane; Updating Legacy Databases through Wrappers: Data Consistency Management; Nov. 2004; 10 pages.*

* cited by examiner

Financial Statements

Show quick criteria maintenance                                                Change query View [Standard View] [▼] | [Print Version] [Excel]

| Financial Statement Item ⇕ | Text for B/S P&L Item | Total of reporting period ⇕ | Currency ⇕ | T |
|---|---|---|---|---|
| 7 | ASSETS | 0.00 | | |
| 7 | ====== | 0.00 | | |
| 8 | CASH & CASH EQUIVALENTS | 0.00 | | |
| 8 | ------ | | | |
| 17 | 111000 Petty Cash | 12,899.00 | CAD | |
| 17 | * Total Petty Cash | 12,899.00 | CAD | |
| 18 | 113000 Concentration Account - Bank TD Canada | 986.00- | CAD | |
| 18 | 113010 Lockbox Account - Bank TD Canada | 476.00 | CAD | |
| 18 | 113016 Lockbox Account - Checks In | 2,990.00 | CAD | |
| 18 | 113025 Controlled Disbursement Acct - Checks Out | 31,690.00- | CAD | |
| 18 | * Total Bank Account | 29,210.00- | CAD | |
| 8 | ** Total Cash & Cash Equivalents | 16,311.00- | CAD | |

Financial Statements — 434

506 —

| Financial Statement Item | Text for B/S P&L Item | Total of reporting period | Currency | Tot |
|---|---|---|---|---|
| 7 | ASSETS | | | |
| 7 | ===== | | | |
| 8 | CASH & CASH EQUIVALENTS | | | |
| 8 | | | | |
| 17 | 111000 Petty Cash | 12,899.00 | CAD | |
| 17 | * Total Petty Cash | 12,899.00 | CAD | |
| 18 | 113000 Concentration Account - Bank TD Canada | 986,00- | CAD | |
| 18 | 113010 Lockbox Account - Bank TD Canada | 524,00 | CAD | |
| 18 | 113016 Lockbox Account - Checks In | 2,990,00 | CAD | |
| 18 | 113025 Controlled Disbursement Acct - Checks Out | 31,690,00- | CAD | |
| 18 | * Total Bank Account | 29,162.00- | CAD | |
| 8 | ** Total Cash & Cash Equivalents | 16,263.00- | CAD | |
| 9 | ACCOUNTS RECEIVABLE | | | |

METHOD AND SYSTEM FOR PROVIDING A REPORT CONNECTOR

CROSS-REFERENCE TO RELATED APPLICATIONS

This application claims the benefit of and priority to U.S. Provisional Patent Application No. 60/855,686, to Matthias Geiger, Miro Vins and Patrick Zimmer, filed on Oct. 30, 2006, entitled "Generic Report UI Connector," which is hereby incorporated by reference in its entirety.

BACKGROUND INFORMATION

Services provided by a computing system may include any type of functionality provided by the system and may be implemented at least in part by software applications of the system. A particular service may include a business functionality and be implemented by an application which includes business logic to perform the business functionality. One type of service is a report, which provides data based on selection criteria. Typically, a report is implemented by an application which receives the selection criteria from a user, and which retrieves the data from a database.

One problem with reports implemented by applications is that the implementing application, and thus the report that it implements, may become outdated in some aspect over time. Generally speaking, legacy applications exist which have become outdated in some aspect but which are still useful in some other aspect. For example, a legacy application may implement an existing report which still retrieves data in a desirable manner, but which has a user interface that has become outdated or undesirable. Furthermore, it may be difficult to separate the still-useful aspect of the existing report from the outdated aspect, as the portion of the legacy application which implements the still-useful aspect may be highly integrated with the portion which implements the outdated aspect. Often one cannot simply run the legacy application and only utilize the still-useful aspect of the existing report without also being undesirably presented with the outdated aspect. Moreover, it may be burdensome to completely redevelop the existing report in a new application because there are typically a prohibitively large number of existing reports which may need such redevelopment. Additionally, to redevelop the still-useful aspects of the existing report may be inefficient given the still-useful nature of these aspects.

BRIEF DESCRIPTION OF THE DRAWINGS

So that features of the present invention can be understood in detail, a description of the invention can be had by reference to embodiments, some of which are illustrated in the appended drawings. It is to be noted, however, that the appended drawings illustrate only particular embodiments of the invention and are therefore not to be considered limiting of its scope, for the invention may admit to other equally effective embodiments.

FIG. 4B is a display depicting one embodiment of a results portion of the report interface of the first application.

DETAILED DESCRIPTION

Figure 1A:
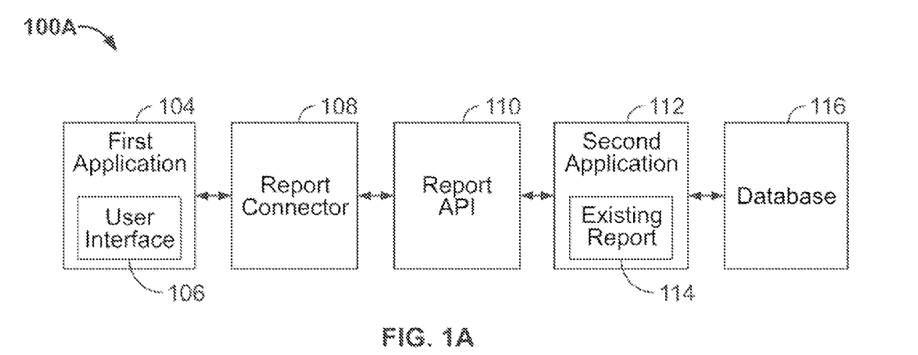
FIG. 1A is a schematic diagram depicting one embodiment of a software architecture.

FIG. 1A depicts an exemplary embodiment of a software architecture 100A. The depicted embodiment of the software architecture 100A has software components including a first software application 104, a report connector 108, a report application programming interface (API) 110, a second application 112, and a database 116. The first application 104 is capable of communicating with a user and the report connector 108. The first application 104 has a user interface 106 which is capable of receiving input from the user and providing output to the user. In one embodiment, the user interface 106 is a graphical user interface. The report connector 108 is capable of communicating with the first application 104 and the report API 110. The report API 110 is capable of communicating with the report connector 108 and the second application 112. The second application 112 is capable of communicating with the report API 110 and the database 116. The second application 112 includes the existing report 114, which has a functionality to access the database 116 to retrieve data based on selection criteria. In one embodiment, the second application 112 has a plurality of different existing reports 114.

The report API 110 provides to the report connector 108 an API for the existing report 114 of the second application 112. Generally speaking, an API is an interface to a computing system functionality provided for a software component. The report API 110 is capable of providing, for at least some other software components, an interface to access the existing report 114 of the second application 112. In the embodiment depicted in FIG. 1A, the report API 110 provides, for the report connector 108, an interface to access the existing report 114 of the second application 112.

Figure 1B:
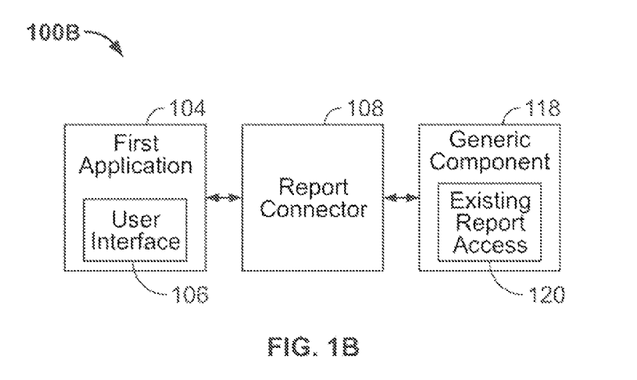
FIG. 1B is a schematic diagram depicting another embodiment of the software architecture.

Other embodiments of the software architecture are also possible. FIG. 1B depicts another exemplary embodiment of the software architecture 100B having software components which are at least partially different than the software components of the embodiment depicted in FIG. 1A. The embodiment of the software architecture 100B depicted in FIG. 1B has software components including the first application 104 and the report connector 108 in the same way as the embodiment depicted in FIG. 1A. However, instead of the report API 110, second application 112 and the database 116 depicted in FIG. 1A, the embodiment of FIG. 1B has a generic software component 118 that includes a means 120 to access the existing report 114. In one embodiment, the existing report 114 is a report of the generic component 118. In another embodiment, the existing report 114 is a report of yet another software component (not shown), different than the generic component 118, that is accessed by the access means 120. The generic component 118 provides an alternative functionality to the combination of the report API 110, second application 112 and database 116 depicted in FIG. 1A. However, in both of the embodiments depicted in FIGS. 1A and 1B, the report connector 108 is provided some form of access to the existing report 114.

Figure 2:
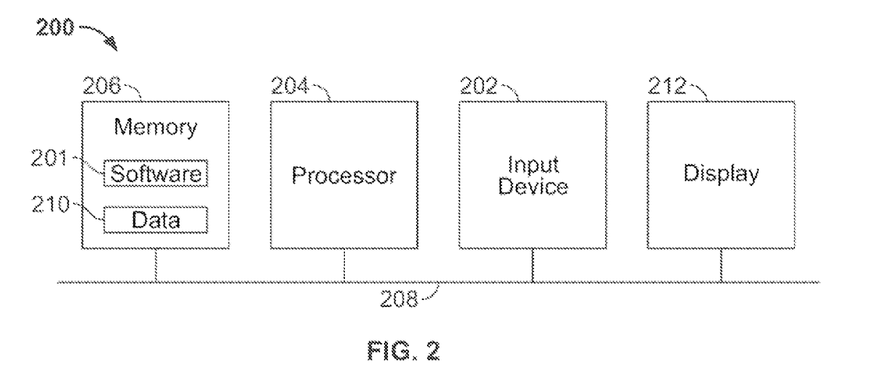
FIG. 2 is a schematic diagram depicting one embodiment of a computing environment.

The embodiments of the software architecture 100A and 100B run in, and are part of, a computing environment 200, an exemplary embodiment of which is depicted in FIG. 2. The depicted embodiment of the computing environment 200 includes an input device 202, processor 204, memory 206, communication line 208 and display 212. The input device 202 includes at least one of: a keyboard, a mouse, a voice activated controller, an optical controller, an infrared controller, or other suitable input device. The memory 206 includes at least one of: a random access memory, a disk storage memory, or other suitable memory. The display 212 includes at least one of: a monitor, a television, a video projector, or other suitable display device. The memory 206 further includes data 210 and software components 201, which are stored in the memory 206 at least at some moment in time. The data 210 optionally includes data which is accessible by or integral to the database 116. In one embodiment, the software components 201 include the software components of the embodiment of the software architecture 100A depicted in FIG. 1A. In one embodiment, the software components 201 include the software components of the embodiment of the software architecture 100B depicted in FIG. 1B. The software components 201 include computer program instructions which may be accessed and executed by the processor 204. The software components 201 are implemented in any suitable software language such as, for example, WebDynpro ABAP, Java, C, and C++.

The memory 206, processor 204, input device 202 and display 212 are connected together and communicate with each other by means of the communication line 208. In one embodiment, the communication line 208 includes a system bus, and the computing environment 200 has a single computer. In another embodiment, the communication line 208 includes a network element, and the computing environment 200 includes a distributed computing environment. In one embodiment in which the computing environment 200 is distributed, the memory 206, processor 204, input device 202 and display 212 are optionally distributed across different locations. In one embodiment in which the computing environment 200 is distributed, the computing environment 200 optionally includes a plurality of some or all of the memory 206, processor 204, input device 202 and display 212. In one embodiment in which the computing environment 200 is distributed, the software components 201 are optionally distributed across a plurality of different memories 206, and are capable of being accessed and executed by a plurality of different processors 204. Other embodiments of the computing environment 200 are also possible.

In one embodiment, the report connector 108 depicted in FIGS. 1A and 1B includes a separately encapsulated set of computer program instructions. In one embodiment, each of the software components depicted in FIGS. 1A and 1B includes a separately encapsulated set of computer program instructions. A software component including the separately encapsulated set of computer program instructions has its own set of computer program instructions and does not rely on the computer program instructions of the other components to perform the tasks assigned to that specific component. In one embodiment, the separately encapsulated set of computer program instructions of a specific component includes computer program instructions to implement any communication interfaces that component may have. For example, each component optionally performs both tasks that do not require communication with other components and tasks that do require communication with other components. Each software component that communicates with another software component includes an interface to perform the communication with that other software component. The communication between the interfaces of two software components optionally includes the passing of data between the interfaces.

Figure 3:
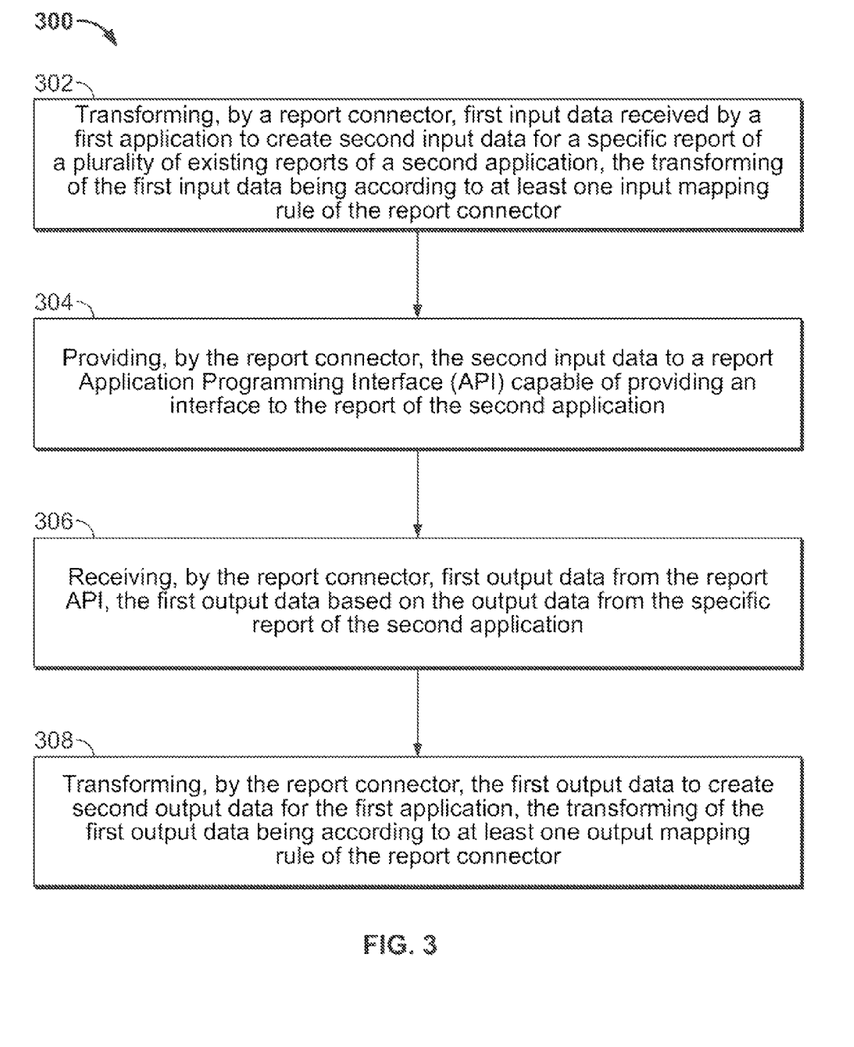
FIG. 3 is a flow chart depicting a schematic representation of one embodiment of a method.

FIG. 3 is a flow chart depicting a schematic representation of one embodiment of a method 300. The embodiment of the method 300 depicted in FIG. 3 is suitable to be performed within the context of the embodiment of the software architecture 100A depicted in FIG. 1A. However, other embodiments of the method 300 can be performed with other embodiments of the software architecture, for example the embodiment of the software architecture 100B depicted in FIG. 1B. The software components of the software architecture 100 include computer program instructions, which when executed by the processor 204, enable the performance of embodiments of the method 300. In one embodiment, the report connector 108 includes computer program instructions, which when executed by the processor 204, enable the performance of the embodiment of the method 300 depicted in FIG. 3. In one embodiment, a computer-readable medium includes the computer program instructions which enable the performance of the method 300. In one embodiment, a system includes means to perform each of the steps of the method 300. For example, in one embodiment, the means to perform each of the steps of the method 300 include elements of the computing environment 200.

In the embodiment depicted in FIG. 3, at step 302 the report connector 108 transforms a first input data 402 (shown in FIG. 4A) to create a second input data 502 (shown in FIG. 5A) according to at least one input mapping rule 602 (shown in FIG. 6) of the report connector 108. The first input data 402 is received by the first application 104 from the user, and the report connector 108 receives the first input data 402 from the first application 104. In one embodiment, the user is a human user of the computing environment 200, and the first input data 402 is provided to the first application 104 by the user using the graphical user interface 106 of the first application 104.

The report connector 108 provides a connection for the first application 104 to the still-useful aspects of the existing report 114 of the second application 112 without necessitating the use of the outdated or undesirable aspects of the second application 112. For example, in one embodiment, the first application 104 is a relatively newer application having a relatively newer user interface 106, and the second application 112 is a relatively older application, i.e., a legacy application, having a relatively older user interface 506 (shown in FIGS. 5A and 5B). In such an embodiment, the user interface 106 of the first application 104 is optionally developed to provide a functionality that replaces, or is a substitute for, the functionality of the user interface 506 of the second application 112, and the report connector 108 enables the simultaneous use of the user interface 106 of the first application 104 and the data retrieval functionality of the existing report 114 of the second application 112.

Figure 4A:
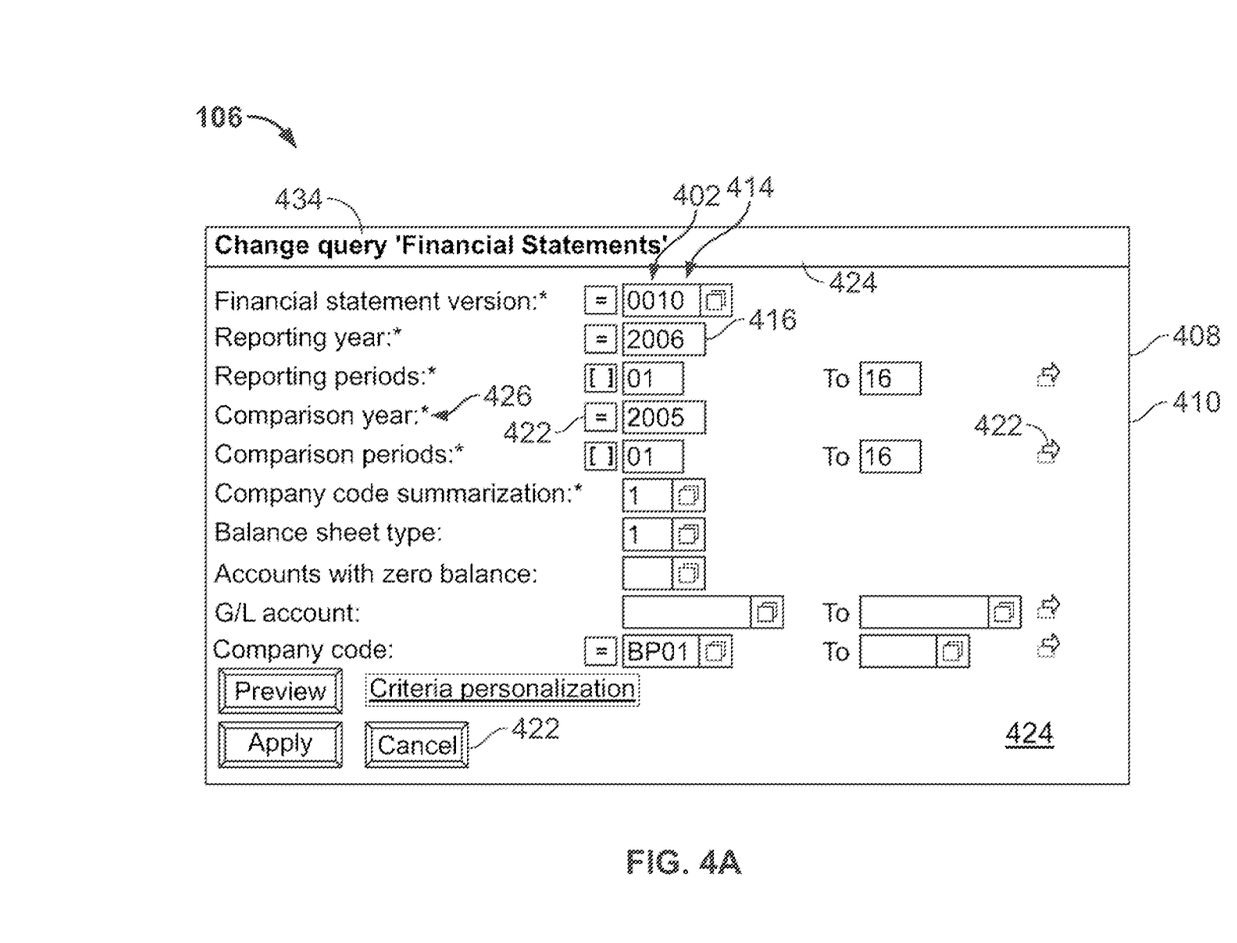
FIG. 4A is a display depicting one embodiment of a selection criteria portion of a report interface of a first application.

Generally speaking, a report includes both an interface portion and a data retrieval portion. The interface portion of the report receives the selection criteria from the user and displays the results of the report, including the retrieved data, and the data retrieval portion retrieves the data selected by the selection criteria. FIGS. 4A and 4B depict exemplary embodiments of a report interface 408 of the first application 104. In one embodiment, the first application 104 provides an updated report interface 408 for use in association with the existing reports 114 of the second application 112. FIG. 4A depicts an exemplary embodiment of a selection criteria portion 410 of the report interface 408 of the first application 104. FIG. 4B depicts an exemplary embodiment of a results portion 412 of the report interface 408 of the first application 104.

Figure 5A:
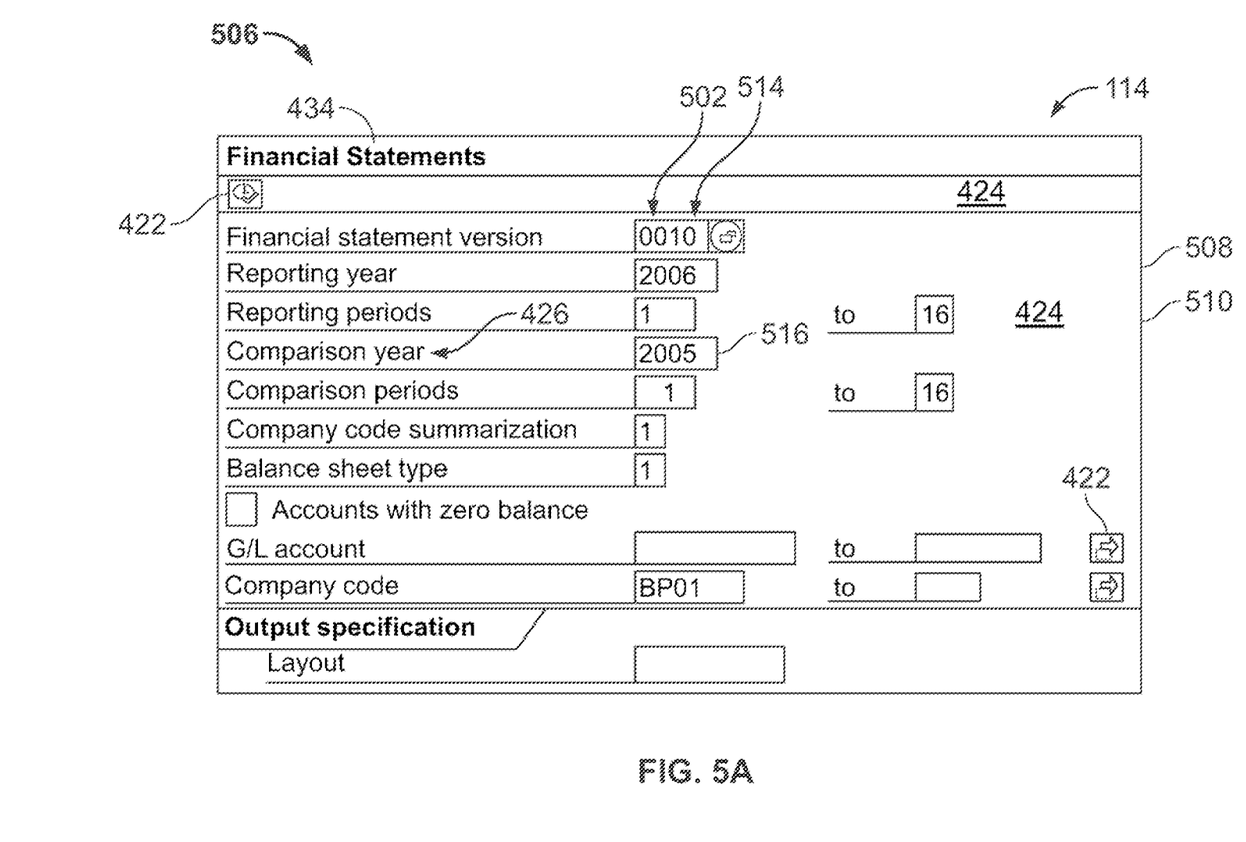
FIG. 5A is a display depicting one embodiment of a selection criteria portion of a report interface of an existing report of a second application.
Figure 5B:
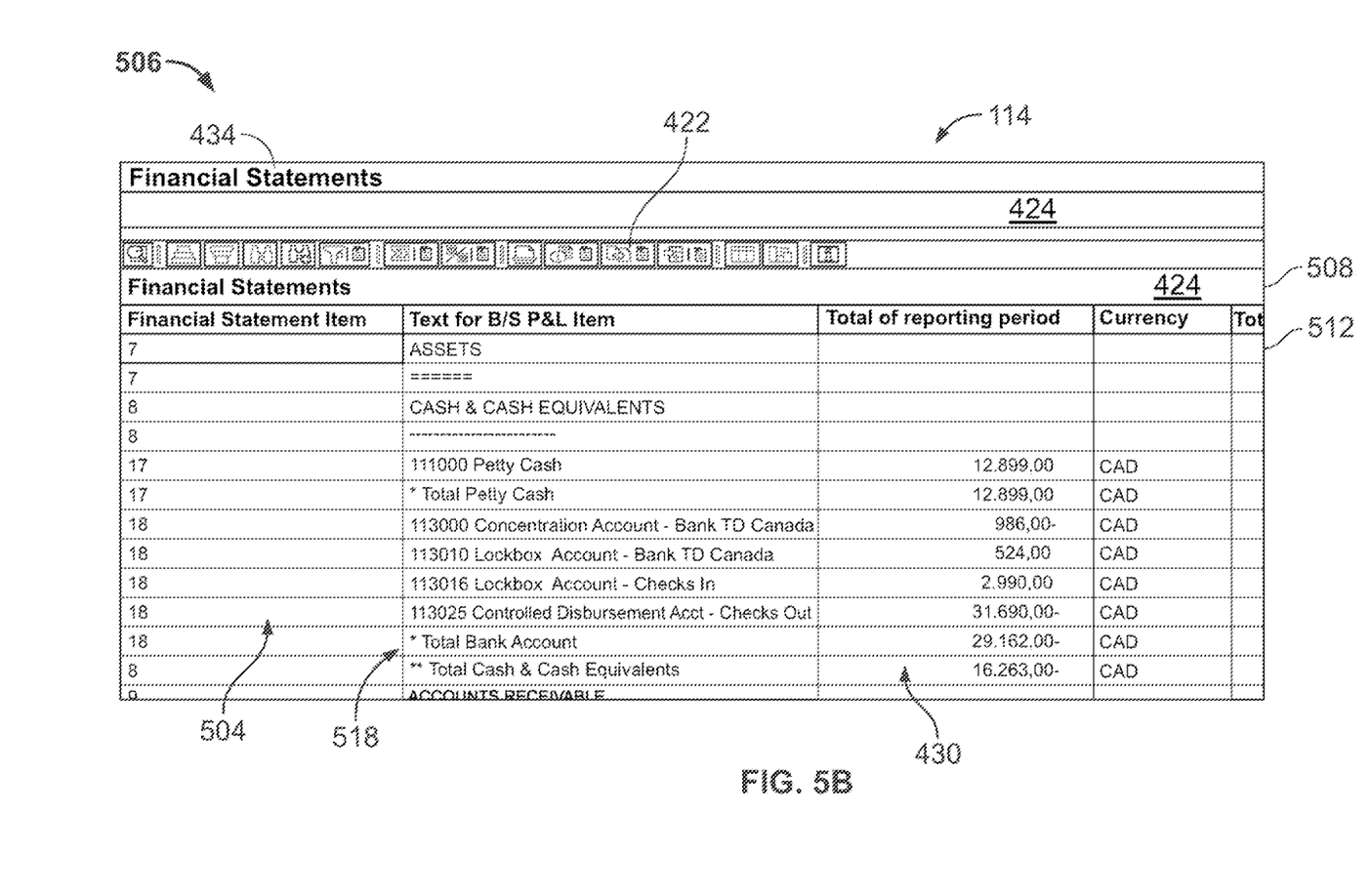
FIG. 5B is a display depicting one embodiment of a results portion of the report interface of the existing report of the second application.

FIGS. 5A and 5B depict exemplary embodiments of the report interface 508 of the existing report 114 of the second application 112 corresponding to the exemplary embodiments of the report interface 408 of the first application 104 depicted in FIG. 4A-B. FIG. 5A depicts an exemplary embodiment of a selection criteria portion 510 of the report user interface 508 of the existing report 114 of the second application 112 corresponding to the exemplary embodiment of the selection criteria portion 410 of the report interface 408 of the first application 104 depicted in FIG. 4A. FIG. 5B depicts an exemplary embodiment of a results portion 512 of the report interface 508 of the existing report 114 of the second application 112 corresponding to the exemplary embodiment of the results portion 412 of the report interface 408 of the first application 104 depicted in FIG. 4B.

Generally speaking, a report requires values for specific selection criteria to be run by an application, and in turn retrieves specific data based on the values provided for the specific selection criteria. In one embodiment, the first input data 402 provided to the first application 104 by the user includes a first selection criteria 414 and a first report identifier 606 (shown in FIG. 6). The first selection criteria 414 provides input that will be used to communicate a second selection criteria 514 to the second application 112, and the first report identifier 606 provides input that will be used to communicate a second report identifier 608 (shown in FIG. 6), identifying the identity of the specific report 114, to the second application 112. In the exemplary embodiment depicted in FIG. 4A, an exemplary embodiment of the first input data 402 is shown, including an exemplary embodiment of the first selection criteria 414. For example, in the embodiment depicted in FIG. 4A, the first selection criteria 414 are the values entered in the various first selection criteria data entry fields 416. Likewise, in the exemplary embodiment depicted in FIG. 5A, an exemplary embodiment of the second input data 502 is shown, including an exemplary embodiment of the second selection criteria 514. For example, in the embodiment depicted in FIG. 5A, the second selection criteria 514 are the values entered in the various second selection criteria data entry fields 516. Note, however, as discussed below, in one embodiment of the method 300 the second selection criteria 516 are not provided manually by the user to the report interface 508 of the user interface 506 of the second application 112, but are instead provide by the report API 110. In one embodiment, each of the plurality of existing reports 114 requires a different specific selection criteria.

Which of the plurality of existing reports 114 of the second application 112 is identified, generally speaking, by a report identifier. The first report identifier 606 is typically provided to the first application 104 by the user selecting a particular report interface 408 of the first application 104 from among a plurality of available report interfaces 408 of the first application 104.

Figure 6:
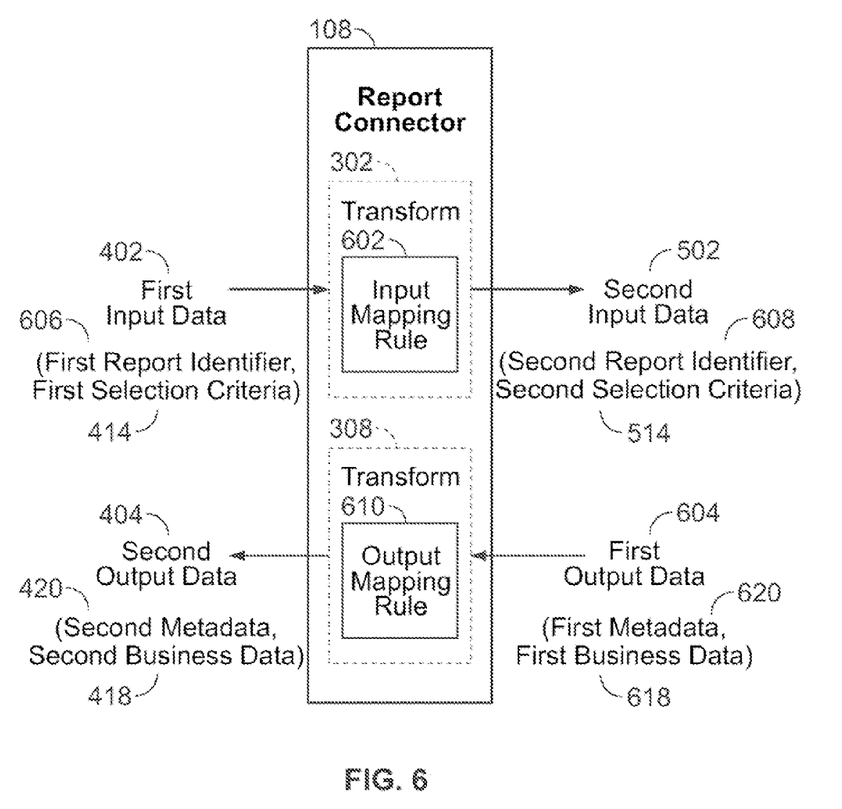
FIG. 6 is a schematic diagram depicting one embodiment of a report connector.

The transforming of the user input of step 302 is according to the at least one input mapping rule 602 of the report connector 108. FIG. 6 is a schematic diagram depicting one embodiment of the report connector 108. The at least one input mapping rule 602 provides information used by the report connector 108 to transform the first input data 402 to create the second input data 502. The input mapping rule 602 provides the report connector 108 with the ability to map the first selection criteria 414 and first report identifiers 606 used by the first application 104 to those that will are required by the existing report 114 of the second application 112. One benefit that this provides is that it gives a developer flexibility in developing the first application 104. For example, the first application 104 is optionally developed to provide an updated report interface 408 for each of the existing reports 114 of the second application 112. Because the input mapping rule 602 maps the first selection criteria 414 and first report identifier 606 used by the first application 104 to the second selection criteria 514 and second report identifier 608 provided to the report API 110, the developer is provided with flexibility in terms of choosing specific first selection criteria 414 and first report identifiers 606 to use internally in the first application 104. For example, the developer may wish to use a reduced set of first selection criteria 414 in comparison to the existing second selection criteria 514, or to use an alternate naming convention for the first report identifiers 606 in comparison to the existing second report identifiers 608. In an exemplary situation in which a developer uses a reduced set of first selection criteria 414, the input mapping rule 602 can be used to provide values to the specific second selection criteria 514 not included in the first selection criteria 414.

Figure 7A:
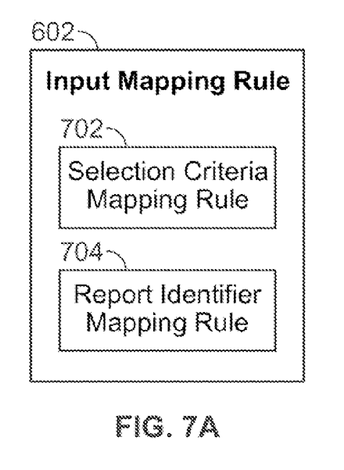
FIG. 7A is a schematic diagram depicting one embodiment of an input mapping rule.

In one embodiment, the at least one input mapping rule 602 includes at least one of: a selection criteria mapping rule 702 (shown in FIG. 7A), or a report identifier mapping rule 704 (shown in FIG. 7A). The transforming of step 302 is optionally according to a plurality of input mapping rules 602 of the report connector 108. FIG. 7A is a schematic diagram depicting an exemplary embodiment of the at least one input mapping rule 602 having both the selection criteria mapping rule 702 and the report identifier mapping rule 704. The selection criteria mapping rule 702 includes information used by the report connector 108 to transform the first selection criteria 414 to create the second selection criteria 514. For example, in one embodiment the selection criteria mapping rule 702 can provide information to provide default values for certain second selection criteria 514. This may be useful if the developer of the first application 104 has decided to eliminate certain second selection criteria 514 from the report interface 408 of the first application 104 corresponding to a specific existing report 114 of the second application 112. Those eliminated selection criteria can be added to the first selection criteria 414 entered by the user of the report interface 408 of the first application 104 by the input mapping rule 602 to create a complete set of second selection criteria 514 provided to the report API 110, and in one embodiment, ultimately provided to the second application 112.

The report identifier mapping rule 704 includes information used by the report connector 108 to transform the first report identifier 606 to create a second report identifier 608. For example, in one embodiment, the first report identifier 606 identifies one of a plurality of report interfaces 408 available to the user at the first application 104, and the second report identifier 608 identifies a corresponding one of a plurality of existing reports 114 of the second application 112 available to the report connector 108 at the report API 110. This may be useful to the developer of the first application 104 in order to provide the developer with flexibility as to the specific form of first report identifiers 606 used within the first application 104.

The at least one input mapping rule 602 optionally identically passes the first input data 402 to the second input data

502. For example, in one embodiment, the at least one input mapping rule 602 transforms the first input data 402 to create the second input data 502 including at least one of: the second selection criteria 514 which is identical to the first selection criteria 414, or the second report identifier 608 which is identical to the first report identifier 606. In one embodiment, the report API 110 provides the second input data 502 it receives from the report connector 108 to the existing report 114 of the second application 112.

Note that FIG. 6 does not provide a temporal representation of the transforming of the first input data 402 of step 302. That is, the transforming of the first report identifier 606 to create the second report identifier 608 does not necessarily happen at the same time as the transforming of the first selection criteria 414 to create the second selection criteria 514. FIG. 6 is instead a schematic diagram that shows the functionality of the report connector 108, collectively with respect to transforming of the first input data 402, without indicating the temporal nature of the transforming of the first input data 402. The temporal nature of the transforming of the first input data 402 is discussed in more detail further below.

In the embodiment depicted in FIG. 3, the method 300 proceeds to step 304 after step 302. At step 304 the second input data 502 is provided to the report API 110 by the report connector 108. The report connector 108 has a communication interface capable of communicating with the report API 110. The report API 110 has a communication interface capable of communicating with the report connector 108, and a communication interface capable of communicating with the second application 112. The second application 112 has a communication interface capable of communicating with the report API 110. The report API 110 is capable of requesting any of the plurality of existing reports 114 of the second application 112. In one embodiment, the report API 110 is capable of requesting at least one existing report 114 of a plurality of different second applications 112. In one embodiment, the report API 110 is capable of requesting a plurality of different existing reports 114 of each of a plurality of different second applications 112. In one embodiment, the report API 110 does not have an interface accessible to the user. For example, in one embodiment, the report API 110 does not have a graphical user interface.

In the embodiment depicted in FIG. 3, the method 300 proceeds to step 306 after step 304. At step 306, the report connector 108 receives a first output data 604 from the report API 110. The first output data 604 is based on the results of the execution of the requested existing report 114 by the second application 112. The first output data 604 includes first business data 618 and first metadata 620. The providing of the second input data 502 to the report API 110 of step 304 triggers the report API 110 to request the report identified by the second report identifier 608 from the second application 112. The requesting of the identified report 114 by the report API 110 in turn triggers the executing, by the second application 112, of the requested report 114 to produce raw output data 504. The raw output data 504 is determined by the report API 110, which produces the first output data 604 based on the raw output data 504.

Generally speaking, the process of executing a report by an application produces output data which includes all the data needed to display the report interface, including the selection criteria portion and the results portions of the report interface, as well as the data retrieved by the data retrieval portion of the report. The metadata is the portion of the output data that describes how the report interface is displayed, including the selection criteria portion and the results portions, and the business data is the portion of the output data that is the specific data that the selection criteria has identified for retrieval from the database.

The business data does not need to pertain only to business situations. Instead, the business data may be any type of data that any type of business, organization or individual may choose to have. For example, a company may maintain a database including data concerning the employees of the company. In a first exemplary situation, selection criteria may select a certain set of the employees of the company, for example based on their title, such as selecting only engineers. In this first exemplary situation, the resulting business data includes employee data of the selected set of employees, i.e. of only engineers. For example, in this first exemplary situation, the resulting business data may include the employee start data, their salary, employee reviews, birth date, identification number, home address, or any other employee data the company maintains. In a second exemplary situation, the selection criteria may further select not only a certain set of employees, e.g. the engineers, but may also further select the returned data to include only certain types of employee data, for example, name, identification number and salary. In this second exemplary situation, the business data would include the name, identification number and salary of the engineers of the company, but not other employee data maintained by the company. Other examples of business data are numerous and varied.

The first business data 618 received by the report connector 108 from the report API 110 is based on the raw output data 504 produced by the executing of the existing report 114 by the second application 112. In one embodiment, the raw output data 504 includes raw business data 518 and the first business data 618 is based on the raw business data 518. In one embodiment, the first business data 618 is identical to the raw business data 518. In one embodiment, the first business data 618 includes at least one of: alpha-numerical textual data, graphic data, or video data.

The metadata is associated with the user interface portion of the report, and describes how the report will be displayed. For example, the metadata describes how the selection criteria portion and the results portion of the report interface are displayed. In one embodiment, the metadata includes at least one of: data describing display characteristics of the business data, or data describing display characteristics of a user interface element. In one embodiment, the metadata includes both of these exemplary types of metadata.

The metadata describing the display characteristics of the business data itself describe how to display specifically the business data. Specific pieces of the metadata can describe display characteristics of specific pieces of the business data or display characteristics of all or an indicated portion of the business data. The metadata describing the display characteristics of the business data optionally includes at least one of: data describing the visual appearance of the business data in the report, or data describing the positioning of the business data in the report. For example, in one embodiment, the business data includes alpha-numeric textual data. In such an embodiment, the metadata describing the visual appearance of the business data itself optionally includes at least one of: the font of the business data, the color of the business data, or the size of the business data. The metadata describing the positioning of the business data as part of the display of the report optionally includes at least one of: the absolute position of a specific piece of business data in the results portion of the report interface, the relative position of the specific piece of business data relative to another specific piece of the business data in the results portion of the report interface, or the relative position of the specific piece of business data relative to a user interface element of the results portion of the report interface.

The metadata can also describe display characteristics of user interface elements of the report interface. User interface elements of the report interface can accompany both the selection criteria portion and the results portion of the report interface. User interface elements of the report interface form part of the report interface and contribute to the functionality of the report interface. Typical user interface elements include tables, buttons, drop down boxes, selectable items, graphical elements, background elements, etc. User interface elements also typically have properties which control their display and functional characteristics. Typical properties of a button, for example, include the definition of states of the button, for example, an activated state in which the user has selected the button, an inactive state in which the button is not selected, and a rollover state in which the button has been rolled over, for example with a mouse, but not selected. The definition of such button states may include, for example, an indication of the appearance of the button during those states. Another aspect of the user interface element is also the position of the user interface element in the report interface.

The general characteristics of metadata discussed above are applicable to any of the metadata discussed herein, including the first metadata 620, the second metadata 420 and raw metadata 520.

In one embodiment, the metadata (i.e. the first, second or raw metadata 620, 420, 520) describes at least one user interface element. In one embodiment, the metadata describing the user interface element includes at least one of: the type of user interface element, a property of the user interface element, or a display position of the user interface element in the report interface. The metadata describing the display position of the accompanying user interface element optionally includes at least one of: an absolute position of the user interface element in a particular portion the report interface, a relative position of the user interface element relative to another user interface element of the report interface, or the relative position of the user interface element relative to a business data displayed in the report interface.

The exemplary embodiments depicted by FIGS. 4A and 4B and FIGS. 5A and 5B show exemplary embodiments of user interface elements. For example, the exemplary embodiments of these figures include, among other user interface elements, buttons 422, background color areas 424, descriptive text 426, drop down boxes 428, tables 430, column selectors 432, titles 434, and the data entry fields 516, 416.

In the embodiment depicted in FIG. 3, the method proceeds to step 308 after step 306. At step 308, the report connector 108 transforms the first output data 604 to create second output data 404 according to at least one output mapping rule 610 of the report connector 108. The second output data 404 includes second metadata 420 and second business data 418.

The transforming of the first output data 604 of step 308 is according to the at least one output mapping rule 610 of the report connector 108. The at least one output mapping rule 610 provides information used by the report connector 108 to transform the first output data 604 to create the second output data 404. The output mapping rule 610 provides the report connector 108 with the ability to map the specific form of the first output data 604 produced by the report API 110 to a form of the second output data 404 that is usable by the first application 104. One benefit that the output mapping provides is that it enables selective updating of aspects of the first output data 604. For example, in one embodiment, the first output data 604 produced by the report API 110 includes elements based on both still-useful elements of the existing report 114 and outdated elements of the existing report 114. The output mapping rule 610 is able to map the still-useful aspects of the existing report 114 into an unchanged form in the second output data 404, and map the outdated (or not useful or desirable) aspects in a modified (or new) form in the second output data 404. For example, in an exemplary situation in which the data retrieval portion of the existing report 114 is still useful, e.g. the first business data 618 is still useful, but at least a part of the user interface portion of the existing report 114 has become outdated, e.g., the first metadata 620 is outdated, the output mapping rule 610 can map the first business data 618 into the second output data 404 in an unchanged form, and map the first metadata 620 into the second output data 404 in a modified form. Furthermore, the output mapping rule 610 is not limited to passing the first business data 618 unchanged and modifying the first metadata 620. In one embodiment, the output mapping rule 610 selectively maps the first business data 618 into modified and unmodified portions in the second business data 418, and selectively maps the first metadata 620 into modified and unmodified portions in the second metadata 420.

Figure 7B:
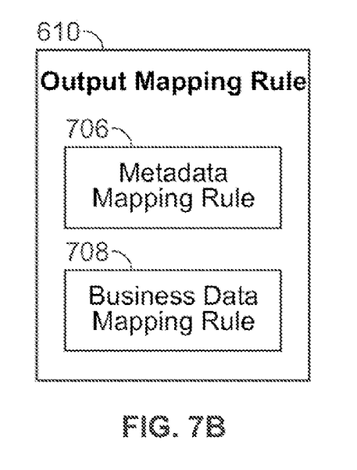
FIG. 7B is a schematic diagram depicting one embodiment of an output mapping rule.

In one embodiment, the at least one output mapping rule 610 includes at least one of: a metadata mapping rule 706 (shown in FIG. 7B), or a business data mapping rule 708 (shown in FIG. 7B). The metadata mapping rule 706 includes information used by the report connector 108 to transform the first metadata 620 to create the second metadata 420. The business data mapping rule 708 includes information used by the report connector 108 to transform the first business data 618 to create the second business data 418. The transforming of step 308 is optionally according to a plurality of output mapping rules 610 of the report connector 108. FIG. 7B is a schematic diagram depicting an exemplary embodiment of the at least one output mapping rule 610 having at least one metadata mapping rule 706 and at least one business data mapping rule 708.

In one embodiment, the at least one input mapping rule 602 and the at least one output mapping rule 610 are part of the computer program instructions of the report connector 108. In one embodiment, the at least one input mapping rule 602 and the at least one output mapping rule 610 are stored in the memory 206 and are accessible to the computer program instructions of the report connector 108.

Note that FIG. 6 does not provide a temporal representation of the transforming of the first output data 604 of step 308. That is, the transforming of the first metadata 620 to create the second metadata 420 does not necessarily happen at the same time as the transforming of the first business data 618 to create the second business data 418. FIG. 6 is instead a schematic diagram that shows the functionality of the report connector 108, collectively with respect to transforming of the first output data 604, without indicating the temporal nature of the transforming of the first output data 604. The temporal nature of the transforming of the first output data 604, as well as the temporal nature of the transforming of the first input data 402, is discussed in more detail below.

The selection criteria portion 410 and the results portion 412 of the report interface 408 of the first application 104 typically are temporally different portions of the report interface 408. In other words, the selection criteria portion 410 is typically presented to the user first, and then the results portion 412 is typically presented to the user at some point after the initial presenting of the selection criteria portion 410. Furthermore, in a process of executing a specific existing report 114, which includes both the presenting of the selection criteria portion 410 and the results portion 412 of the report interface 408 of the first application 104 to the user, steps 302 and 308 typically each occur a plurality of times. For example, in one embodiment of the method 300, the transforming of the first input data 402 of step 302 occurs at least twice, including during the transforming of the first report identifier 606 to create the second report identifier 608 as a result of the picking of a particular report interface 408 by the user, and again, at a different time, during the transforming of the first selection criteria 414 to create the second selection criteria 514 as a result of the user entering the first selection criteria 414 at the report interface 408. Thus, in one embodiment, the transforming of step 302 transforms the first report identifier 606 at a different time than the transforming of step 302 transforms the first selection criteria 414. In one embodiment, the transforming of step 302 may occur more than twice during the process of executing the existing report 114.

Similarly, in one embodiment, the transforming of the first output data 604 of step 308 occurs at least twice, including during the transforming of the first metadata 620 to create the second metadata 420 in order to display the section criteria portion 410 and the results portion 412 of the report interface 408, and again, at a different time, during the transforming of the first business data 618 to create the second business data 418 to display the results portion 412 of the report interface 408. Thus, in one embodiment, the transforming of step 308 transforms the first metadata 620 at a different time than it transforms the first business data 618. In one embodiment, the transforming of step 308 transforms all of the first metadata 620, including any of the first metadata 620 corresponding to the first business data 620, before the existing report 114 is executed in the second application 112 as initiated by the report API 110. That is, the report connector 108 receives all of the first metadata 620 from the report API 110 in response to providing the second report identifier 608 to the report API 110. In one embodiment, the first metadata 620 includes a first portion corresponding to the selection criteria portion 510 of the report interface 508 of the second application 112 and a second portion corresponding to the results portion 512 of the report interface 508 of the second application 112, and the transforming of step 308 creates second metadata 420 including a first portion corresponding to the selection criteria portion 410 of the report interface 408 of the first application 104 and a second portion corresponding to the results portion 412 of the report interface 408 of the first application 104. In one embodiment, the transforming of step 308 may occur more than twice during the process of executing a report. For example, the transforming of step 308 optionally includes a series of transforms of individual pieces of the first output data 604.

Figure 8:
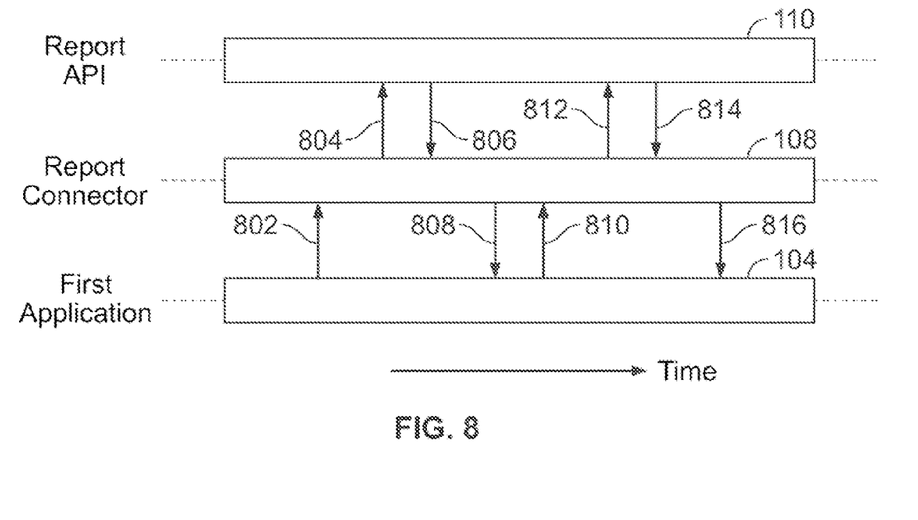
FIG. 8 is a flow diagram depicting another schematic representation of aspects of the method depicted in FIG. 3.

FIG. 8 is a schematic diagram depicting an exemplary embodiment of aspects of the method 300 unfolding over time. In the depicted embodiment, the report connector 108 receives the first report identifier 606 from the first application 104 in a first communication 802 as a result of the user having selected a particular report interface 408 in the first application 104. The report connector 108 provides the second report identifier 608 to the report API 110 in a second communication 804. The report connector 108 receives the first metadata 620 from the report API 110 in a third communication 806, the first metadata 620 corresponding to both the selection criteria portion 510 and the results portion 512 of the report interface 508 of the second application 112. The report connector 108 provides the second metadata 420 to the first application 104 in a fourth communication 808, the second metadata 420 corresponding to both the selection criteria portion 410 and the results portion 412 of the report interface 408 of the first application 104. The report connector 108 receives the first selection criteria 414 from the first application 104 in a fifth communication 810, as a result of the user having provided the first selection criteria 414 to the first application 104. The report connector 108 provides the second selection criteria 514 to the report API 110 in a sixth communication 812. The report connector 108 receives the first business data 618 from the report API 110 in a seventh communication 814, the first business data 618 corresponding to the results portion 512 of the report interface 508 of the second application 112. The report connector 108 provides the second business data 418 to the first application 104 in an eighth communication 816, the second business data 418 corresponding to the results portion 412 of the report interface 408 of the first application 104. In the depicted embodiment, the first through eighth communications 802-816 happen temporally in order from first to eighth.

The temporal spacing depicted in FIG. 8 typically results in a temporal distribution of each of the transforming of steps 302 and 308 of the method 300. That is, step 302 typically is performed more than once in association with the executing of the existing report 114 of the second application 112, for example, at a moment in time in between the first and second communications 802, 804 and at a moment in time in between the fifth and sixth communications 810, 812 depicted in FIG. 8. Similarly, step 308 is typically performed more than once in association with the executing of the existing report 114 of the second application 112, for example, at a moment in time in between the third and fourth communications 806, 808 and at a moment in time in between the seventh and eighth communications 814, 816 depicted in FIG. 8.

The output mapping rule 610 optionally provides the report connector 108 with the ability to map outdated or undesirable user interface elements to more modern or more desirable user interface elements. For example, in one embodiment, the first metadata 620 describes a first user interface element, the second metadata 420 describes a second user interface element, the description of the second user interface element being at least partially different than the description of the first user interface element, and the metadata mapping rule 706 includes information used by the report connector 108 to transform the description of the first user interface element to create the description of the second user interface element.

The output mapping rule 610 also optionally provides the report connector 108 with the ability to map a large amount of business data into a smaller amount of business data by removing some business data. For example, in one embodiment, the first business data 618 includes a first set of a plurality of data elements retrieved from the database 116, the second business data 418 includes a second set of the plurality of data elements retrieved from the database 116, the second set composed of data elements from the first set, the second set having fewer data elements than the first set, and the business data mapping rule 708 includes information used by the report connector 108 to transform the first set of data elements to create the second set of data elements. Alternatively or in addition to the output mapping rule 610 mapping a large amount of business data into a smaller amount of business data, in one embodiment the mapping of a large amount of business data into a smaller amount of business data by removing some business data is implemented in the report API 110 or the first application 104.

Figure 9:
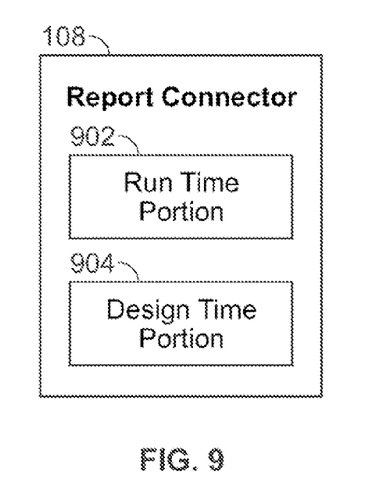
FIG. 9 is a schematic diagram depicting one embodiment of the report connector.

In one embodiment, the method 300 includes at least one of: steps occurring during runtime, or steps occurring during design-time. In one embodiment, the method 300 includes steps occurring during runtime and steps occurring during design-time. Runtime includes a time during which the user is using the user interface 106 of the first application 104 to trigger the report connector 108 to transform the first input data 402 and the first output data 604. For example, in one embodiment, the steps 302, 304, 306 and 308 of the method 300 occur during runtime. Design-time includes a time during which the user is not using the user interface 106 of the first application 104 to trigger the report connector 108 to transform the first input data 402 and the first output data 604. In one embodiment, the method 300 includes determining, by the report connector 108 at design-time, at least a portion of at least one of: the at least one input mapping rule 602, or the at least one output mapping rule 610. FIG. 9 depicts one embodiment of the report connector 108 including both a runtime portion 902 which is capable of performing runtime steps of the method 300, and a design-time portion 904, which is capable of performing design-time steps of the method 300.

In one embodiment, the method 300 includes predetermining at least a first portion of the at least one input mapping rule 602 and at least a first portion of the at least one output mapping rule 610 by a company originally developing the report connector 108 for sale or license. In such an embodiment, an entity which purchases or licenses the report connector from the originally developing company can use the predetermined at least the first portion of the at least one input mapping rule 602 and at least the first portion of the at least one output mapping rule 610 to perform the method 300.

In one embodiment, an entity which purchases or licenses the report connector 108 from the originally developing company further defines the input mapping rule 602 and the output mapping rule 610. In such an embodiment, the method 300 includes selectively determining, by the purchasing or licensing entity at design-time, at least one of: at least a second portion of the at least one input mapping rule 602, or at least a second portion of the at least one output mapping rule 610. The selectively determining optionally includes automatically generating, by the design-time portion 904 of the report connector 108, a first version of the at least one of the second portion of the at least one input mapping rule 602 or the second portion of the at least one output mapping rule 610, and editing the automatically generated first version to create a second version at least partially different than the automatically generated first version. In one embodiment, the automatically generating is based on at least one template rule of the report connector 108, the at least one template rule predetermined by the originally developing company. The editing is optionally done by a user using a user interface of a software component. In one embodiment, the design-time portion 904 of the report connector 108 includes a user interface (not shown) to accomplish the editing.

In one embodiment, the method 300 is applicable to being performed within the context of the embodiment of the software architecture 100 shown in FIG. 1B. In one such embodiment, the method 300 includes: transforming, by the report connector 108, the first input data 402 received by the first application 104 to create the second input data 502 for the specific report 114 of the plurality of existing reports 114 of the second application 112, the transforming of the first input data 402 being according to the at least one input mapping rule 602 of the report connector 108; providing, by the report connector 108, the second input data 502 to a generic component 118 having a means 120 to access the report 114 of the second application 112; receiving, by the report connector 108, the first output data 604 from the generic component 118, the first output data 604 based on the output data 504 from the specific report 114 of the second application 112; and transforming, by the report connector 108, the first output data 604 to create second output data 404 for the first application 104, the transforming of the first output data 604 being according to the at least one output mapping rule 610 of the report connector 108.

In one embodiment, the computer program instructions, which when executed by the processor 204 enable the method 300 to be performed, are distributed from a first storage location to a second storage location. In one embodiment, the distributing of the computer program instructions includes storing the computer program instructions at the first storage location, transmitting the computer program instructions between the first and second storage locations, and storing the computer program instructions at the second storage location. The first and second storage locations each optionally include a memory having the same properties as memory 206 of the computing environment 200 depicted in FIG. 2. The first and second storage locations are optionally distributed across a distributed computing environment having the same properties as the distributed embodiment of the computing environment 200 depicted in FIG. 2.

In one embodiment, transmitting the computer program instructions between the first and second storage locations includes transmitting the computer program instructions by a computer network having a client-server architecture. In the client-server architecture, at least one computer performs the role of a server computer, and stores the computer program instructions at the first storage location. The first storage location is optionally at least one of: a component of the server computer, or a storage location accessible to and controlled by the server computer. In the client-server architecture, at least one second computer performs the role of a client computer, and receives the computer program instructions from the server computer and stores them at the second storage location. The second storage location is optionally a component of the client computer. Generally speaking, in the client-server architecture, the server computer also controls at least some aspect of the distribution of the computer program instructions. For example, in one embodiment, the server computer determines whether or not to allow access by the client computer to the computer program instructions stored at the first storage location. In one embodiment, the transmitting the computer program instructions by the computer network having the client-server architecture includes using a data transmission protocol including at least one of: a Hypertext Transfer Protocol (HTTP), or a File Transfer Protocol (FTP).

In another embodiment, transmitting the computer program instructions between the first and second storage locations includes transmitting the computer program instructions by a computer network having an at least partially decentralized architecture, such as a peer-to-peer network. In the at least partially decentralized architecture, each member computer has at least some networking functionality which is common to all the member computers. For example, in one embodiment, the at least partially decentralized network architecture is a pure peer-to-peer network in which all member computers have the same networking functionality. In another embodiment, the at least partially decentralized network architecture is a hybrid peer-to-peer network in which some networking functions are performed in the same way by all member computers, and some other networking functions are performed according to a client-server architecture.

In the at least partially decentralized architecture, instead of the server computer always providing the computer program instructions to the client computer, a particular member computer may perform the functionality of both providing and receiving the computer program instructions. The particular computer, i.e. a first computer, may receive the computer program instructions in one instance from a second computer, and then provide the computer program instructions in another instance to a third computer. In one embodiment involving the at least partially decentralized architecture, the first and second storage locations are storage locations of computers which are only intermittently connected to the peer-to-peer network, and the transmitting of the computer program instructions between the first and second storage locations occurs on an intermittent basis. The intermittent distribution of the computer program instructions optionally includes packaging the computer program instructions into a plurality of separate transmission packages at the first storage location, transmitting each of the plurality of transmission packages in separate transmissions between the first and second storage locations, and reassembling the plurality of transmission packages at the second storage location to form the computer program instructions.

Further embodiments are also possible, which are the result of variously combining steps, elements or embodiments described herein. For example, further embodiments may include an altered order of the steps of the method 300 described herein, the result of which may be an embodiment particularly suited to a specific purpose or implementation. In another example, embodiments of the method 300 may include or exclude optional steps described herein. In yet another example, different embodiments of the method 300 may be combined to create further embodiments. Additional embodiments, which would be discernable based on the description herein, are also possible.

What is claimed is:

1. A method, comprising:
    receiving first input data at a graphical user interface of a first application, the first input data specifying selection criteria for executing a query to a database;
    transforming, by a report connector, the first input data to create second input data, the transforming being according to at least one input mapping rule of the report connector, the second input data including a second representation of the selection criteria;
    providing, by the report connector, the second input data to a second application via a report application programming interface (API);
    executing, by the second application, a report including the query to the database, using the second input data as input to the query, the second application producing raw business data based on data selected from the database in response to the query and generating raw metadata describing display characteristics of the raw business data and a display characteristic of at least one user interface element of a graphical report user interface of the second application, wherein the database is separate from the second application;
    providing, by the second application, first output data based on the raw business data and raw metadata to the report connector via the report API;
    transforming, by the report connector, the first output data to create second output data, the transforming of the first output data being according to at least one output mapping rule of the report connector; and
    outputting the second output data by the first application as a response to the selection criteria received at the graphical user interface of the first application.

2. The method of claim 1, wherein the first input data comprises a first report identifier and a first selection criteria, the second input data comprises a second report identifier and a second selection criteria, the first output data comprises first metadata and first business data, and the second output data comprises second metadata and second business data.

3. The method of claim 2, wherein the report connector:
    receives the first report identifier from the first application in a first communication, provides the second report identifier to the report API in a second communication, receives the first metadata from the report API in a third communication, provides the second metadata to the first application in a fourth communication, receives the first selection criteria from the first application in a fifth communication, provides the second selection criteria to the report API in a sixth communication, receives the first business data from the report API in a seventh communication, and provides the second business data to the first application in an eighth communication, wherein the first through eighth communications happen temporally in order from first to eighth.

4. The method of claim 2, wherein the at least one input mapping rule comprises at least one of: a selection criteria mapping rule, or a report identifier mapping rule;
    wherein the selection criteria mapping rule comprises information used by the report connector to transform the first selection criteria to create the second selection criteria; and
    wherein the report identifier mapping rule comprises information used by the report connector to transform the first report identifier to create the second report identifier, the first report identifier identifying one of a plurality of report interfaces available to the user at the first application, the second report identifier identifying a second report of the second application.

5. The method of claim 2, wherein the at least one output mapping rule comprises at least one of: a metadata mapping rule, or a business data mapping rule;
    wherein the metadata mapping rule comprises information used by the report connector to transform the first metadata to create the second metadata; and
    wherein the business data mapping rule comprises information used by the report connector to transform the first business data to create the second business data.

6. The method of claim 2, wherein the first metadata describes at least one first user interface element, the second metadata describes at least one second user interface element, the description of the at least one second user interface element being at least partially different than the description of the at least one first user interface element, and the metadata mapping rule comprises information used by the report connector to transform the description of the at least one first user interface element to create the description of the at least one second user interface element.

7. The method of claim 1, wherein the first input data is provided to the first application by the user using the graphical user interface of the first application, the report API does not have a graphical user interface, the report API does not have a user interface, and the report API has an interface accessible to the report connector.

8. The method of claim 1, further comprising:
    requesting, by the report API, a second report from the second application, wherein the report API is capable of requesting each of a plurality of existing reports from the second application, and
    wherein the report API is capable of requesting at least one report from a plurality of different second applications.

9. The method of claim 1,
    wherein a design-time comprises a time during which the user is not using the user interface of the first application to trigger the report connector to transform the first input data and the first output data, the method further comprising:

determining, by the report connector at the design-time, at least a portion of at least one of: the at least one input mapping rule, or the at least one output mapping rule.

10. The method of claim 9, further comprising:

predetermining at least a first portion of the at least one input mapping rule and at least a first portion of the at least one output mapping rule by a company originally developing the report connector for sale or license; and selectively determining at least one of a second portion of the at least one input mapping rule or a second portion of the at least one output mapping rule at the design-time by an entity which has purchased or licensed the report connector from the originally developing company, the selectively determining comprising:

automatically generating a first version of the at least one of the second portion of the at least one input mapping rule or the second portion of the at least one output mapping rule, the automatically generating using at least one template rule of the report connector, the at least one template rule predetermined by the originally developing company; and editing the automatically generated first version to create a second version at least partially different than the automatically generated first version.

11. The method of claim 1, wherein the first output data includes first metadata describing a display characteristic of the at least one user interface element of the graphical report user interface of the second application, the second output data includes second metadata describing a display characteristic of at least one second user interface element of a second graphical report user interface of the first application, and the report connector transforms the first metadata to create the second metadata by modifying at least some of the first metadata.

12. The method of claim 1, wherein the first output data includes first metadata based on the raw metadata, the second output data includes second business data and second metadata, the second metadata describing display characteristics of the second business data, and the report connector transforms the first metadata to create second metadata by modifying at least some of the first metadata.

13. The method of claim 1, wherein the first application is a first computer application and the second application is a second computer application.

14. A non-transitory computer-readable medium comprising computer program instructions, which when executed by a processor perform a method, the method comprising:

receiving first input data at a graphical user interface of a first application, the first input data specifying selection criteria for executing a query to a database;

transforming, by a report connector, the first input data to create second input data, the transforming being according to at least one input mapping rule of the report connector, the second input data including a second representation of the selection criteria;

providing, by the report connector, the second input data to a second application via a report application programming interface (API);

executing, by the second application, a report including the query to the database, using the second input data as input to the query, the second application producing raw business data based on data selected from the database in response to the query and generating raw metadata describing display characteristics of the raw business data and a display characteristic of at least one user interface element of a graphical report user interface of the second application, wherein the database is separate from the second application;

providing, by the second application, first output data based on the raw business data and raw metadata to the report connector via the report API;

transforming, by the report connector, the first output data to create second output data, the transforming of the first output data being according to at least one output mapping rule of the report connector; and outputting the second output data by the first application as a response to the selection criteria received at the graphical user interface of the first application.

15. The non-transitory computer-readable medium of claim 14, wherein the first input data comprises a first report identifier and a first selection criteria, the second input data comprises a second report identifier and a second selection criteria, the first output data comprises first metadata and first business data, and the second output data comprises second metadata and second business data.

16. The non-transitory computer-readable medium of claim 14, the method further comprising:

requesting, by the report API, a second report from the second application, wherein the report API is capable of requesting each of a plurality of existing reports from the second application, wherein the report API is capable of requesting at least one report from a plurality of different second applications.

17. The non-transitory computer-readable medium of claim 14, wherein the first output data includes first metadata describing a display characteristic of the at least one user interface element of the graphical report user interface of the second application, the second output data includes second metadata describing a display characteristic of at least one second user interface element of a second graphical report user interface of the first application, and the report connector transforms the first metadata to create the second metadata by modifying at least some of the first metadata.

18. The non-transitory computer-readable medium of claim 14, wherein the first output data includes first metadata based on the raw metadata, the second output data includes second business data and second metadata, the second metadata describing display characteristics of the second business data, and the report connector transforms the first metadata to create second metadata by modifying at least some of the first metadata.

19. The non-transitory computer-readable medium of claim 14, wherein the first application is a first computer application and the second application is a second computer application.

* * * * *